Patented May 17, 1938

2,117,626

UNITED STATES PATENT OFFICE 2,117,626

PROCESS OF PREPARING SULPHAMIDES

Philipp Osswald, Hofheim (Taunus), Germany, assignor to I. G. Farbenindustrie Aktiengesellschaft, Frankfort-on-the-Main, Germany No Drawing. Application August 21, 1937, Serial No. 160,317. In Germany August 27, 1936

9 Claims. (Cl. 23—190)

The present invention relates to a process of preparing sulphamides.

It is known that the action of ammonia on sulphur trioxide leads to the formation of a mixture of ammonium amidosulphonate, ammonium imidodisulphonate and ammonium sulphate. In order to temper the energetic course of the reaction the operation has been conducted in the presence of more or less large quantities of inert gas.

Now I have found that the action of ammonia upon sulphur trioxide may be conducted in such a manner that sulphamide constitutes a considerable part of the product, presumably being formed according to the equation:

$$SO_3 + 2NH_3 \rightarrow SO_2(NH_2)_2 + H_2O$$

For this surprising course of the reaction the following conditions appear to be necessary:

1. Inert gases must be excluded as much as possible from the reaction.
2. The ammonia gas must act in considerable excess on the sulphur trioxide as soon as the latter enters the chamber.
3. The temperature of the reaction must be kept at a low degree.

The last condition may easily be obtained in a technical manner in connection with the condition 2 by cooling the excess of ammonia gas which leaves the chamber after the separation of the sulphamide which has been formed and by returning this ammonium, for instance, by a fan, to the reaction with $SO_3$. In this manner one procures the presence of the high excess of ammonia which is necessary for the reaction and at the same time the temperature of the reaction is kept at a low degree. The ammonia gas may be cooled and also dried before it is returned to the reaction. By drying the gas the condition mentioned above is fulfilled that inert gases shall be excluded from the reaction. At the same time the water formed during the reaction is prevented from causing in the further course of the reaction together with the sulphur trioxide undesired elevations of the temperature and by-reactions.

It may be advantageous to perform the process in such a manner that the mixture of the reacting gases is moved in a rapid current, but care must be taken that when entering the actual reaction chamber a great excess of amomnia is always present. The motion must be so rapid that the water formed during the reaction can always immediately be removed from the reaction room and then excluded from the circular course of the gases. In this manner by-reactions are forced back to a large extent and the yield of sulphamide is increased. As by-products of the reaction there may be obtained according to the success in adjusting the conditions, ammonium imidodisulphonate, ammonium amidosulphonate and ammonium sulphate. The desired product, sulphamide, may be extracted from this mixture by reason of its specific solubility in organic solvents, especially acetone; the residue left after it has been extracted may be worked in known manner to yield amidosulphonates or amidosulphonic acid.

The following example serves to illustrate the invention but it is not intended to limit it thereto.

Into a current of gaseous ammonia of about 8 cubic metres per hour there is introduced by means of a nozzle in the course of an hour 1 kilo of $SO_3$. The mixture having a temperature of 50–80° C. is blown into a chamber which is cooled from outside and here there is separated about 1 kilo of a smeary-moist product. The excess of the cooled ammonia gas is passed through a filter in order to remove solid matter and is reconducted by a fan to the reaction with $SO_3$, the used portions being substituted by pure ammonia gas which slowly flows in. The product is removed from the chamber and yields on analysis, for instance, 2.94 per cent. of imide-nitrogen, 3.5 per cent. of amide-nitrogen and 6.21 per cent. of sulphamide nitrogen, corresponding to a content of 21.2 per cent. of pure sulphamide. The sulphamide may be obtained therefrom in a pure state by extraction with acetone.

I claim:

1. A process of preparing sulphamide by causing pure ammonia gas to act in a large excess upon pure sulphur trioxide.

2. A process of preparing sulphamide by causing pure ammonia gas free from all inert gases to act in a large excess upon pure sulphur trioxide.

3. A process of preparing sulphamide by causing pure ammonia gas to act in a large excess upon pure sulphur trioxide in a cooled reaction room.

4. A process of preparing sulphamide by introducing pure sulphur trioxide into a rapid current of pure gaseous ammonia in such a manner that already at the entrance of sulphur trioxide a large excess of ammonia is present and that by the motion of the reacting gases the water formed during the reaction is immediately removed from the reaction room.

5. A process of preparing sulphamide which consists in introducing pure sulphur trioxide into a rapid current of pure ammonia in such a manner that already at the entrance of sulphur trioxide a large excess of ammonia is present, moving the reacting gases so that the water formed during the reaction is immediately removed from the reaction room, separating the solid reaction products and returning the excess of ammonia into the reaction.

6. A process of preparing sulphamide which consists in introducing pure sulphur trioxide into a rapid current of pure ammonia in such a manner that already at the entrance of sulphur trioxide a large excess of ammonia is present, cooling the reaction room, moving the reacting gases so that the water formed during the reaction is immediately removed from the reaction room, separating the solid reaction products and returning the excess of ammonia into the reaction.

7. A process of preparing sulphamide which consists in introducing pure sulphur trioxide into a rapid current of pure ammonia in such a manner that already at the entrance of sulphur trioxide a large excess of ammonia is present, moving the reacting gases so that the water formed during the reaction is immediately removed from the reaction room, separating the solid reaction products, cooling the excess of ammonia gas and returning it into the reaction.

8. A process of preparing sulphamide which consists in introducing pure sulphur trioxide into a rapid current of pure ammonia in such a manner that already at the entrance of sulphur trioxide a large excess of ammonia is present, moving the reacting gases so that the water formed during the reaction is immediately removed from the reaction room, separating the solid reaction products, drying the excess of ammonia gas and returning it into the reaction.

9. A process of preparing sulphamide which consists in introducing pure sulphur trioxide into a rapid current of pure ammonia in such a manner that already at the entrance of sulphur trioxide a large excess of ammonia is present, cooling the reaction room, moving the reacting gases so that the water formed during the reaction is immediately removed from the reaction room, separating the solid reaction products, cooling and drying the excess of ammonia gas and returning it into the reaction.

PHILIPP OSSWALD.